Dec. 7, 1937.                     H. D. BEACH                     2,101,016
                                    LENS
                        Filed Aug. 8, 1935              2 Sheets-Sheet 1
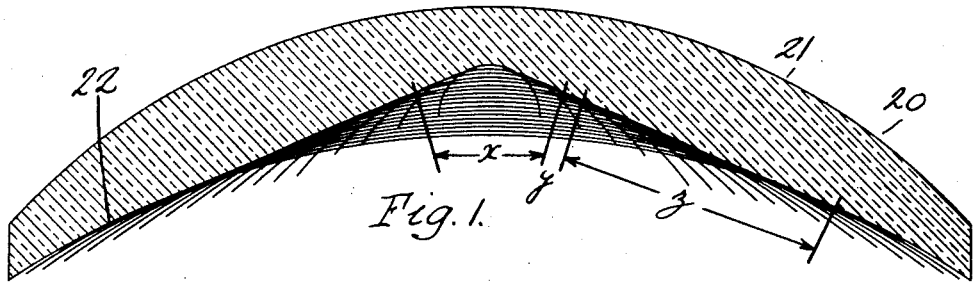
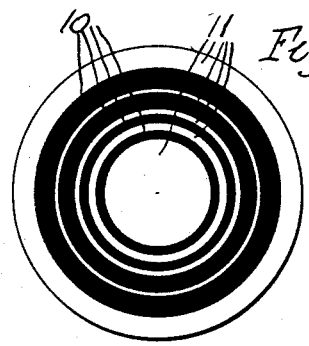 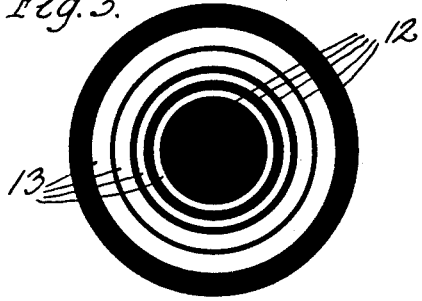
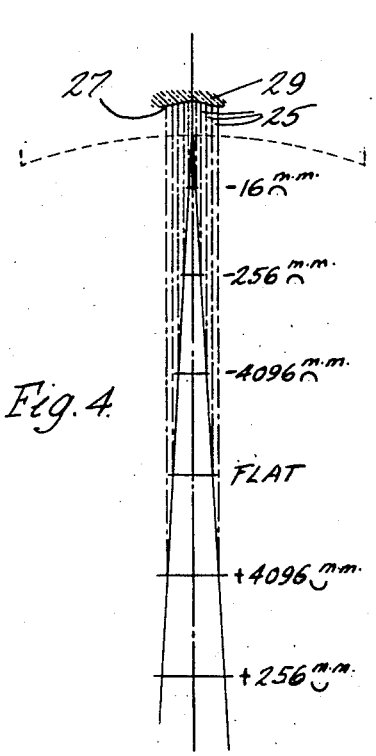 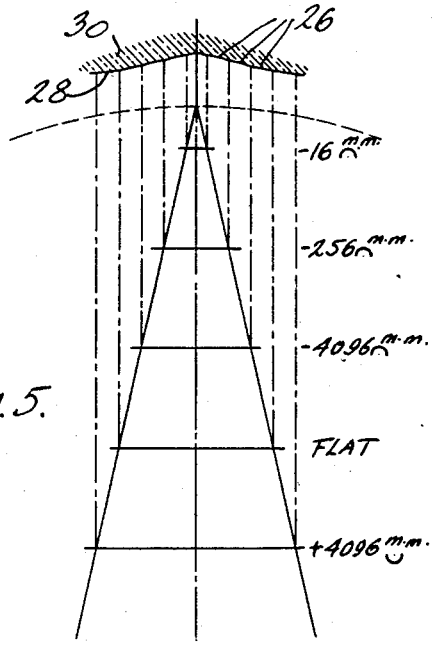
INVENTOR.
Howard D. Beach
ATTORNEYS.

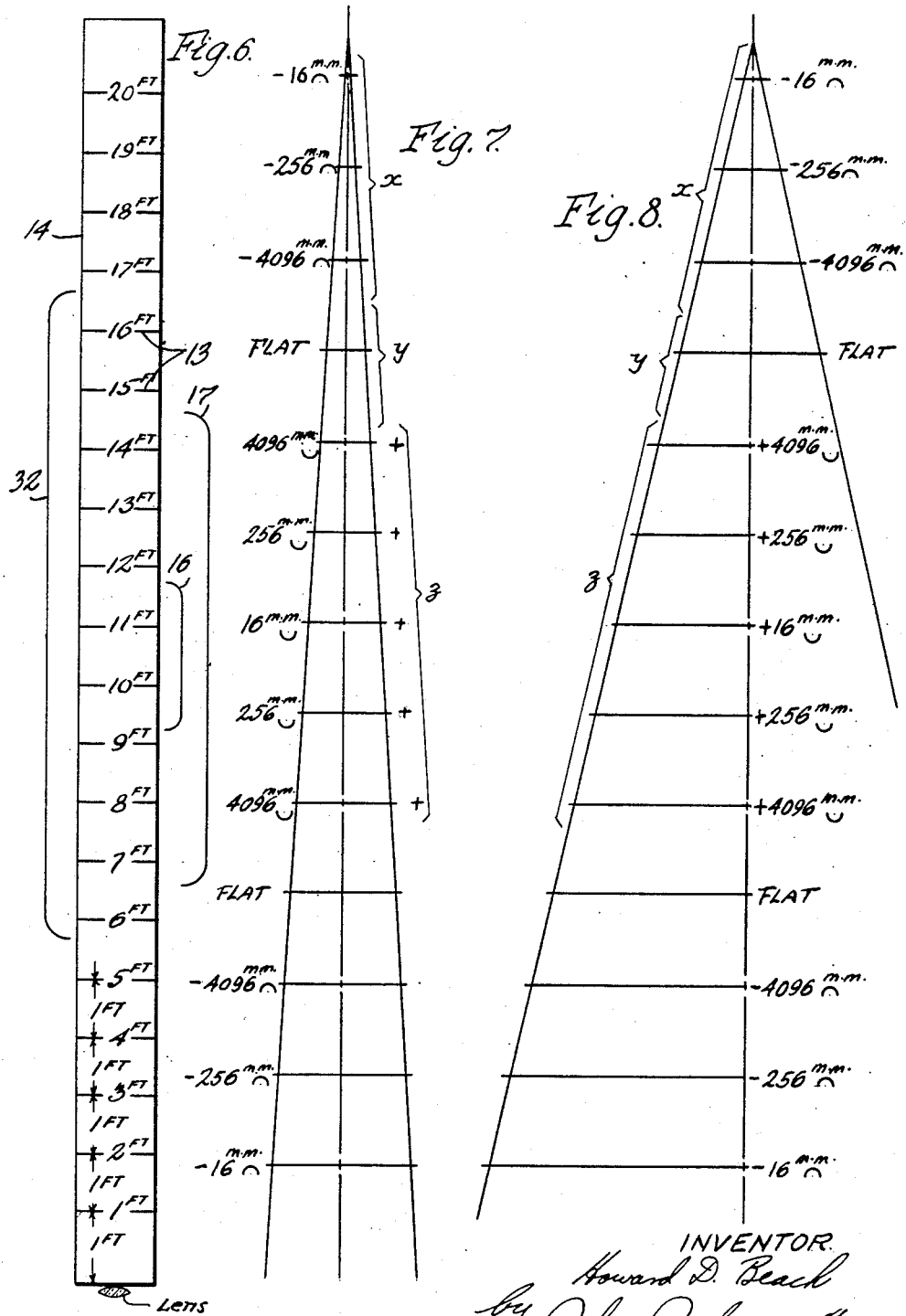

Patented Dec. 7, 1937

2,101,016

UNITED STATES PATENT OFFICE 2,101,016

LENS

Howard D. Beach, Buffalo, N. Y.

Application August 8, 1935, Serial No. 35,332

5 Claims. (Cl. 88—57)

This invention relates to improvements in lenses. Such lenses may be used, for example, in photography, and in eyeglasses for the aid or correction of impaired vision, in telescopes and microscopes and for various other purposes.

In the photographic art, for example, it is well known that most of the lenses now in use are corrected more or less for spherical aberration, but even in the very best and most expensive photographic lenses available, aberration still exists. While its presence is known to some extent, and appears to occur in zones or rings, no method of determining the location or way of eliminating these aberrant zones has been found so far as I am aware.

I have found that aberration in lenses does exist in and results from certain approximately annular or circular zones or rings which are concentric with the optical axis of the lens and vary more or less in spacing and width according to the make or series of the lens.

As the result of many experiments, I am able to locate and define the zones of aberration in various makes of lenses. This I do by placing upon a face of one of the sections or components of any one of the commercial studio or other type of lens concentric, spaced rings of paper or other suitable opaque media, which after trial and error, by focusing the lens and critically examining the images formed at full aperture, finally result in a series of these rings disposed in a certain order as regards width of rings and spacing between these rings. When a lens having these rings in correct order is mounted in a camera before a subject, and this subject is focused upon the ground glass, I find that while the total amount of light passing through the lens from the subject is reduced usually by about 50% by the obstruction offered by the opaque rings, the amount of time required to make a fully timed exposure of the subject is not increased. At the same time the depth of focus is appreciably greater, and a photograph made under these conditions is greatly improved in respect to its stereoscopic and perspective qualities, and shadow detail is increased compared with a photograph made by the same lens under identical conditions but without the presence of the opaque rings or portions.

These results would appear to indicate that of the total light-receiving area of any lens of present form or manufacture, a considerable portion, approximately one-half, is of no value to the production of a good photograph, and is a deterrent to the light gathering and focusing ability of the lens. In other words, about one-half of the light rays from a subject passing through such lens result in aberrant rays which, when they focus at all, come to focus before or behind the picture plane and consequently do not focus sharply upon the picture plane.

Going further in my experiments, if I now remove from any lens the opaque rings or other light-intercepting media applied as above described, and substitute therefor a series of opaque rings which are disposed in complementary or alternating relation with respect to the first rings, or in other words, if I cover those parts of the lens which were previously uncovered, and leave uncovered or unobstructed those parts of the lens which were previously covered, I find that while again approximately 50% of the light rays received upon the lens from the subject is obstructed, in this case those rays which pass through the unobstructed portions or zones of the lens cannot be focused sharply upon the picture plane. The resulting image is blurred and brilliancy and contrast are lacking to a marked extent. I believe, therefore, that the zones thus defined are the aberrant zones, and that they are the cause of the aberration present in the lenses now available.

Having discovered and located the cause of the aberration in lenses of the type under consideration, I next applied myself to the problem of either eliminating these undesirable and useless zones or areas of a lens, or so changing them that they too would focus light rays sharply on the focal plane, or in other words, to the production of a lens in which the entire light-receiving area thereof would be available for gathering light rays and bringing them all sharply into focus upon the focal plane. My efforts have resulted in the production of lenses in accordance with the present invention.

While the experiments determining the presence of aberration in lenses have been conducted with photographic lenses, the same phenomena occur in and can be found in other kinds of lenses, for the same reasons and by the same procedure.

The objects of the invention, therefore, are to produce spherically corrected lenses for the general purposes or use stated, in which the foregoing objections and undesirable features of ordinary lenses have been eliminated; in which the entire area or light-gathering surface is available for the purpose of sharply focusing all of the image rays from a subject or source upon the picture or focal plane; to produce a lens by the use of which vastly superior results are attained as compared with those to be had by the use of lenses now available, and whereby the resulting images are rendered sharper and more brilliant, with improved texture and without aberration, and which nevertheless enables such images to be photographically produced in approximately 50% less exposure time as compared with the exposure period required under like conditions when using an ordinary lens; and also to produce a lens having greatly increased depth of focus at a given aperture in comparison with lenses of known construction; and to produce lenses for other purposes than for photographic use, such as for use with telescopes and microscopes, and in connection with the manufacture of eyeglasses for personal use, and for various other uses.

Other objects of the invention are to provide a lens which may be used as a supplementary or auxiliary lens which, when placed in operative relation to a standard photographic lens, for example, will enable far superior results to be attained than with the same lens without the supplementary lens.

Various other objects and advantages of the invention will be apparent from the following disclosure of an embodiment thereof, and the novel features will be particularly pointed out in connection with the appended claims.

In the accompanying drawings:

Fig. 1 is an enlarged cross sectional diagram of a spherically corrected lens element constructed in accordance with an embodiment of my invention.

Fig. 2 is a diagrammatic illustration representing opaque zones or areas applied to a lens of standard manufacture to demonstrate the presence of zones of aberration therein.

Fig. 3 is a similar view showing zones which are complementary to those of Fig. 2.

Figs. 4 and 5 are diagrammatic, greatly enlarged views showing a lens or section of relatively small diameter, and a lens of greater diameter.

Fig. 6 is a chart or scale which may be used in demonstrating the comparative qualifications of lenses of usual make and those produced in accordance with this invention.

Figs. 7 and 8 are diagrams illustrating my method of making lenses of different diameters.

The principles involved in Figs. 2 and 3 will be first considered.

In Fig. 2 is represented a face of an element or section of any known make of spherical compound lens and which may be assumed to have been corrected by the maker as well as may be for spherical aberration, and available to commerce. Upon this face I have applied a group or series of annular spaced rings or zones of opaque material 10, such as paper or paint, and which are preferably arranged concentrically about the optical axis of the lens, leaving between them a group or series of unobstructed concentric zones or areas 11. The solid black areas 10 of Fig. 2 represent the zones or areas of aberration in that particular lens, while the alternating clear or unobstructed zones 11 represent those areas of the lens through which light or image-forming rays pass to and come to sharp focus upon the picture plane. The particular number, relative width and location of the two sets of zones are determined under studio conditions as the result of cut and dry or elimination methods, each test being carried out by focusing a subject or scene as sharply as possible at the full working aperture or opening of that lens, and critically examining the resulting image as projected on the ground glass or picture plane. Actual exposures are preferably made at intervals. When it appears that the opaque rings have been so disposed as to permit a very clear image without aberration to be formed by the rays passing through the unobstructed zones, it is considered that the particular zones or areas of aberration for that particular lens and their location have been found and are thus represented by the opaque rings 10.

It is important to note that while the amount of light passing through the lens from the subject when the rings 10 are present is reduced to approximately one half of the normal amount, the required exposure period for taking a full exposure remains practically the same as when no opaque obstructions are on the lens. In addition, the depth of focus of the lens at the full aperture has been considerably increased.

If now I remove the opaque rings 10 representing these zones of aberration from the lens and apply to the same lens a series of opaque rings 12, Fig. 3, which are complementary to or will alternate with the rings where were removed, thus covering the former clear or unobstructed zones 11 and leaving clear a series of zones 12, I find upon using this same lens under identical conditions of aperture, distance from the subject and from the focal plane, that again the amount of light passing through the lens in approximately 50% of the normal amount, but the image received upon the ground glass cannot be critically or sharply focused. The image is not only blurred all over but there is a marked lack of contrast and detail. These results appear to clearly indicate that the aberration of lenses of the kind under consideration occurs in zones and that their relative size and location can be determined.

To demonstrate the results of the foregoing, I have illustrated in Fig. 6 a chart representing consecutively numbered lines 13 one foot apart upon a strip of paper 14 or the like, which may be positioned approximately horizontally before and extending away from a lens which has been tested as above outlined with the one foot mark at or approximately that distance away from the lens or camera front. Upon focusing the lens at full aperture, just as it is made, and without the addition of any opaque zones, upon the middle portion of the strip 14, that part of the latter represented by the bracket or line 16, is all that appears critically sharp. If I now remove the lens and apply to a face thereof, or insert within it the opaque bands or rings 10 of Fig. 2, and replace the lens and focus it again under the identical conditions, as before, at full aperture, etc., I find that the depth of focus has been increased to a marked extent, as indicated by the line or bracket 17, Fig. 6. It should be understood that the portions of the strip 14 included in the respective brackets 16 and 17 are those which are critically defined and that while additional portions of the strip may be identified on the ground glass, these portions are not sharply defined.

When the rings 10 of Fig. 2 are removed from the lens and are replaced by the rings 12 of Fig. 3, none of the numbered lines can be sharply focused, those near the center being blurred and softened at the edges, while the remainder are so distorted as to be indefinable.

A consideration of the results of the foregoing tests and examples has led me to the conclusion that the aberrant and useless zones in lenses might be replaced by areas which would supplement the remaining zones through which image rays can be sharply focused on the picture plane, so that all rays passing through such lenses may be made use of and brought to sharp focus on the picture plane, thus adding considerable definition and representation of subjects to the images produced as compared with the results formerly possible.

Most, if not all the surfaces of the former lenses of the type under consideration were of spherical or approximately spherical origin, some being concave or negative and others convex or positive.

I have devised a method by which I produce on a lens surface both negative and positive contours, and these contours are disposed and so related as to merge one into the other in a manner which I believe tends to gather all the rays passing into the lens from near and far parts of a subject, and bring them all to critical focus upon the picture plan. Thus the aberration caused by some rays focusing other than upon the picture plane, is done away with.

The diagram of Fig. 1 is an embodiment of the invention illustrating a lens or lens element having one of its faces contoured or shaped in accordance with and by the use of my novel method of forming or producing lenses. It should be clearly understood that the contour or formation mentioned may be applied to a single or simple lens, or a single section or element of a compound lens. A single lens may be used as an auxiliary lens operatively associated with another single lens or a compound lens, as a lens for spectacles and for other purposes, while when the lens is a section or element of a commercial compound lens, such section may be any one of the individual elements of the lens and may be produced by modifying a surface of one of such lens sections according to my invention, or the section may replace a section of such lens, or may be supplemental to the lens as a whole. Various other uses for lenses formed in accordance with this invention will readily suggest themselves when the following disclosure thereof has been perused.

Referring to Fig. 1, the lens or lens element 20 has an outer convex or positive face 21 which may be of the usual spherical contour, and a second or inner face 22. This face 22 is composed of a multiplicity of extremely narrow, annular zones or areas, individually imperceptible, arranged concentrically about the optical axis of the lens 20 and each formed or generated upon a different radius. These radii are applied in numerical order so that the composite curve or surface developed by the entire series of zones is a continuous flowing line or face without ridges or indentations which, if present, would produce aberration.

An example of one formula for producing such a lens surface is seen in Fig. 7, which represents a succession of radii applied to a lens to produce a contour similar to that on the face 22 of Fig. 1. The first radius at the top is indicated as minus 16 m. m., and a small section or zone of this curvature is found in the center of the face 22. The next curvature in order is minus 256 m. m. (a multiple of 16) and the next minus 4096 m. m. Each succeeding arc cuts the previous arc and leaves only an infinitesimal zone or area of that curvature, and the curves increase gradually in radius. Finally a group of consecutive large radius curves are formed, embracing, for example, that of minus 4096 m. m. and these produce an almost flat zone. The next zone produced is or may be actually flat, and from then on a series of plus curves or radii, again in numerical but reversed order, are used. It should be noted that the radii of the curves given are purely arbitrary and a much greater number of curves of intermediate radii are preferably used in actual practice.

The minus numerals at the top of Fig. 7 may be taken to represent approximately the area formed on the lens and marked $x$ in Fig. 1, which is a minus curve tending to gather and sharply focus rays from distant points or objects, and the marginal sections of this arc $x$ blend imperceptibly into a substantially flat section $y$ formed by radii close to and including flat or zero zones and will gather and focus rays from the middle distance of a subject. The section $y$, in turn, connects the zone $x$ with a relatively wide positive area or zone $z$ which is formed by the consecutive positive radii and acts to gather and sharply focus rays from nearby objects.

The relative size of the areas $x$, $y$ and $z$ can, of course, be varied for different requirements and can also be in reversed order if desired. They may also be wider or narrower, and may be disposed otherwise than in concentric relation to the lens axis.

Fig. 8 shows an example of the same set of curvatures as in Fig. 7, applied to a lens or surface of larger diameter and which would result in a flatter or less concave curve. To produce on this second or large lens a curve of greater depth or concavity, a greater number of radii may be employed, or the same radii as before may be used by causing each radius to enter farther into the lens.

The comparative results of the two applications of the radii shown in Figs. 7 and 8 are illustrated in Figs. 4 and 5, in which the same radii —16 m. m., —256 m. m. and —4096 m. m. are represented, very greatly enlarged, as forming zones 25 in Fig. 4 and wider zones 26 in Fig. 5, in the concave faces 27 and 28 respectively of the lenses or lens blanks 29 and 30, portions only of which are indicated.

The formation of a large number of these minute zones having radii each differing from the other, but arranged in sequence, causes to be produced a continuous, flowing curve which includes zones on the lens which will gather or receive and focus sharply upon a picture plane all of the image rays from a subject before the lens.

Even in the greatly enlarged cross section of Fig. 1 in which many intermediate radii are omitted, it will be observed that the sum total of all the arcs shown forms a substantially continuous, unbroken curve on the face 22 of the lens 20.

In the finished lenses as actually produced in accordance with this invention, there are no perceptible, individual zones, the surface being absolutely unbroken, smooth and capable of receiving the necessary high polish. Eyeglass lenses also produced in the same way have no demarked areas, and vision is improved to a remarkable extent, since all the different planes of a subject, scene or object are rendered equally sharp upon the retina by the multiplicity of different foci represented.

Such lenses are far superior to the usual bifocal or so called multifocal spectacle lenses now available.

Upon taking the commercially produced lens with which the experiments referred to in Figs. 2, 3 and 6 were conducted and forming upon a face of one of the elements or sections thereof, a shape or contour like that shown, for example, in Fig. 1, and described above, and mounting it in a camera before the strip or scale shown in Fig. 6, at the same distance from the one foot mark, and at full aperture, I find that upon focusing the lens upon the middle section of the strip it will sharply focus and define upon the ground glass approximately all of that portion indicated by the line or bracket 32 while all of the lines and numbers on the remainder of the strip are sufficiently defined to be identified. This demonstrates that lenses constructed in accordance with this invention give results far superior to those obtainable with present types of lenses, in that depth of focus is greatly increased, better rendition of a subject is given, and with an attendant and very substantial increase in speed.

The production of these different infinitesimal zones or areas on lenses can be effected in different ways. For example, I may provide a series of precision tools, grinders or the like elements which may be mounted so as to be successively presented to and work upon or grind the face of a lens blank or element directly. Figs. 4 and 5 may be assumed to represent such a procedure.

However, I may produce the desired contour upon a lens by first making a mold of plaster of Paris, or any other material, using a plurality of tools of consecutive radii in proper sequence to effect a curve of the required form in a face thereof. I then use this mold to form or mold a grinding or polishing tool or pad having a contour of reverse or complementary shape upon its working face. This tool or pad is then mounted in axial alinement with the lens to be worked and either the tool or the lens, or possibly both, are rotated until the desired shape has been produced upon the lens. In certain instances the lenses may be produced directly by molding, the mold first being produced with the desired contour.

While I have described and illustrated the formation of the novel contour or shape as applied to an inner face of a lens or lens element it should be understood that the work can be done upon an outer face of a lens or section in accordance with the principles disclosed, if desired.

I claim as my invention:

1. A spherically corrected lens comprising a body of light transmitting and refracting material having one convex arcuate face, and having its opposite face of generally concave form the medial section of which is a smooth, continuously flowing curve, composed of negative, flat and positive concentric portions each formed of a multiplicity of minute, concentric, annular zones of imperceptible width and of different radii of curvature arranged in consecutive order and in successive numerical value, and with the centers of curvature of all of said zones located upon a common optical axis.

2. A spherically corrected lens comprising a body of light transmitting and refracting material having one convex arcuate face, and having its opposite face of generally concave form the medial section of which is a smooth, continuously flowing reverse curve from the center to the edge of the lens and which face is composed of a central negative portion surrounded by a portion of positive curvature, and each of said portions being formed of a multiplicity of minute, concentric annular zones of imperceptible width and of different radii of curvature arranged in consecutive order and in successive numerical value, and with the centers of curvature of all of said zones located upon a common optical axis.

3. A spherically corrected lens comprising a body of light transmitting and refracting material having one convex arcuate face, and having its opposite face of generally concave form the medial section of which is a smooth, continuously flowing reverse curve from the center to the edge of the lens and which face is composed of a central negative portion of non-spherical curvature surrounded by a positive annular portion of non-spherical curvature, and each of said portions being formed of a multiplicity of minute, concentric, annular zones of imperceptible width and of different radii of curvature arranged in consecutive order and in successive numerical value, and with the centers of curvature of all of said zones located upon a common optical axis.

4. A spherically corrected lens comprising a body of light transmitting and refracting material having one convex arcuate face, and having its opposite face of generally concave form the medial section of which is a smooth, continuously flowing reverse curve from the center to the edge of the lens and which face is composed of a central negative portion of non-spherical curvature surrounded by a relatively narrow, annular portion substantially without curvature and which, in turn, is surrounded by a positive, annular portion of non-spherical curvature and each of said portions being formed of a multiplicity of minute, concentric, annular zones of imperceptible width and of different radii of curvature arranged in consecutive order and in successive numerical value, and with the centers of curvature of all of said zones located upon a common optical axis.

5. A spherically corrected lens comprising a body of light transmitting and refracting material having opposite arcuate faces, one of said faces having in medial section a smooth, continuously flowing curve, composed of negative, flat and positive concentric portions each formed of a multiplicity of minute, concentric, annular zones of imperceptible width and of different radii of curvature arranged in consecutive order and in successive numerical value, and with the centers of curvature of all of said zones located upon a common optical axis.

HOWARD D. BEACH.